(12) United States Patent
Miyakawa

(10) Patent No.: US 8,156,386 B2
(45) Date of Patent: Apr. 10, 2012

(54) INFORMATION PROCESSING APPARATUS, AND METHOD AND COMPUTER PROGRAM FOR CONTROLLING SAME, FOR DETECTING CERTAIN FAILURES

(75) Inventor: Takumi Miyakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 12/771,013

(22) Filed: Apr. 30, 2010

(65) Prior Publication Data

US 2010/0293414 A1    Nov. 18, 2010

(30) Foreign Application Priority Data

May 14, 2009   (JP) .................................. 2009-118042

(51) Int. Cl.
*G06F 11/00* (2006.01)
(52) U.S. Cl. ....................................... 714/55; 714/38.12
(58) Field of Classification Search ............... 714/38.12, 714/55
See application file for complete search history.

(56) References Cited

U.S. PATENT DOCUMENTS

| | | | | |
|---|---|---|---|---|
| 3,996,567 A | * | 12/1976 | Avsan ............................ | 713/502 |
| 4,453,210 A | | 6/1984 | Suzuki et al. ................... | 714/25 |
| 5,737,515 A | * | 4/1998 | Matena ............................ | 714/23 |
| 5,978,939 A | * | 11/1999 | Mizoguchi et al. ............. | 714/55 |
| 6,351,824 B1 | * | 2/2002 | Singh ............................... | 714/23 |
| 6,665,758 B1 | * | 12/2003 | Frazier et al. ................... | 710/200 |
| 7,383,470 B2 | * | 6/2008 | Canning et al. ............ | 714/38.11 |
| 2003/0084381 A1 | * | 5/2003 | Gulick ............................. | 714/47 |
| 2004/0237006 A1 | * | 11/2004 | Adkisson et al. ............... | 714/55 |
| 2008/0126650 A1 | * | 5/2008 | Swanson et al. ............... | 710/267 |
| 2009/0113255 A1 | * | 4/2009 | Reilly ............................. | 714/55 |

FOREIGN PATENT DOCUMENTS

| | | |
|---|---|---|
| JP | 55-138149 | 10/1980 |
| JP | 5-181760 | 7/1993 |

* cited by examiner

*Primary Examiner* — Joseph Schell
(74) *Attorney, Agent, or Firm* — Fitzpatrick, Cella, Harper & Scinto

(57) ABSTRACT

An information processing apparatus having a first subsystem and a second subsystem, is provided. The first subsystem includes a first updating unit configured to update a first counter at a priority higher than that of a processing task executed by the first subsystem, and a second updating unit configured to update a second counter at a priority lower than that of the processing task. The second subsystem includes a check unit configured to check whether the first and second counters have been updated, and a determination unit configured to determine that failure has occurred in the first subsystem if at least one of the first and second counters has not been updated.

9 Claims, 9 Drawing Sheets

INFORMATION PROCESSING APPARATUS, AND METHOD AND COMPUTER PROGRAM FOR CONTROLLING SAME, FOR DETECTING CERTAIN FAILURES

BACKGROUND OF THE INVENTION

1. Field of the Invention

The present invention relates to an information processing apparatus and to a method and computer program for controlling this apparatus.

2. Description of the Related Art

In an embedded device that requires high functionality and high-speed processing, the system takes on enormous size if all of these functions are driven by the same CPU. This can influence maintainability and performance. Meanwhile, the integration involved in LSI is proceeding and it has become easy to mount multiple chips on one chip. In the development of embedded devices, an effective system development method includes driving a plurality of subsystems on a chip equipped with a plurality of CPUs and having each of the subsystems execute, on a per-function basis, the processing required by the system. In a case where a failure has occurred in such a system equipped with a plurality of subsystems, detecting the failure is said to be difficult. The reason is that subsystems driven by separate CPUs are such that even if one subsystem halts, another subsystem is capable of continuing operation and therefore, even though some subsystems shut down, there are instances where a failure in the overall system cannot be discovered. Accordingly, a method of detecting failure based upon whether or not there is a command response between subsystems is in wide use as a subsystem failure detection method.

For example, according to a technique described in the specification of Japanese Patent Laid-Open No. 5-181760, one subsystem issues a command to a separate subsystem and, if a time-out occurs before the command is returned, it is determined that the subsystem has halted. According to the specification of U.S. Pat. No. 4,453,210 (Japanese Patent Laid-Open No. 55-138149), subsystem failure is sensed using a shared memory. A counter is disposed on a common memory shared by subsystems, updating of the counter by one subsystem is monitored by a separate subsystem and it is determined that a subsystem has halted in a case where the counter is not updated.

In general, failures that occur in a subsystem are device failure, which is ascribable to a fault in a device such as a CPU or memory, and system operation shutdown, such as deadlock ascribable to a software bug within the subsystem. In a case where device failure has occurred, a measure such as giving notification to the user is required. In a case where system operation shutdown has occurred, on the other hand, recovery is possible by software recovery processing. This means that it would be desirable if the kind of failure that has occurred in one subsystem could be detected in another subsystem.

With the method of detecting failure using a command, however, it is not possible to detect the fact that some software has caused deadlock and resulted in halt in a subsystem. The reason is that command processing is a combination of interrupt processing and task processing and it is not possible to discriminate in which layer a command failure is located. Further, there are instances where even in a case where some tasks have halted owing to deadlock or the like, the task relating to command processing is executed preferentially and the command still succeeds. Further, with the failure detection method using an existing counter, a single counter is used and overall subsystem failure detection is carried out by confirming updating of the counter. With this method, there are instances where it is not possible to detect the fact that some software has caused deadlock and resulted in halt in a subsystem. The reason is that in a case where the task that updates the counter is being executed at a priority higher than that of the task in which deadlock occurred, count processing is executed normally independently of the task that gave rise to deadlock.

Accordingly, the present invention provides a technique for accurately detecting failure that has occurred in a subsystem.

SUMMARY OF THE INVENTION

According to one aspect of the present invention, an information processing apparatus having a first subsystem and a second subsystem, is provided. The first subsystem includes a first updating unit configured to update a first counter at a priority higher than that of a processing task executed by the first subsystem, and a second updating unit configured to update a second counter at a priority lower than that of the processing task. The second subsystem includes a check unit configured to check whether the first and second counters have been updated, and a determination unit configured to determine that failure has occurred in the first subsystem if at least one of the first and second counters has not been updated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described with reference to the accompanying drawings.

First Embodiment

In general, the present invention is applicable to an information processing apparatus that includes a plurality of subsystems and a memory shared by these subsystems. In this embodiment, the information processing apparatus 100 handled will be one in which TCP/IP and lower layer communication processing is executed by a communication subsystem 110 to thereby alleviate the processing load on an application subsystem 120.

(Configuration of Information Processing Apparatus 100)

Figure 1:
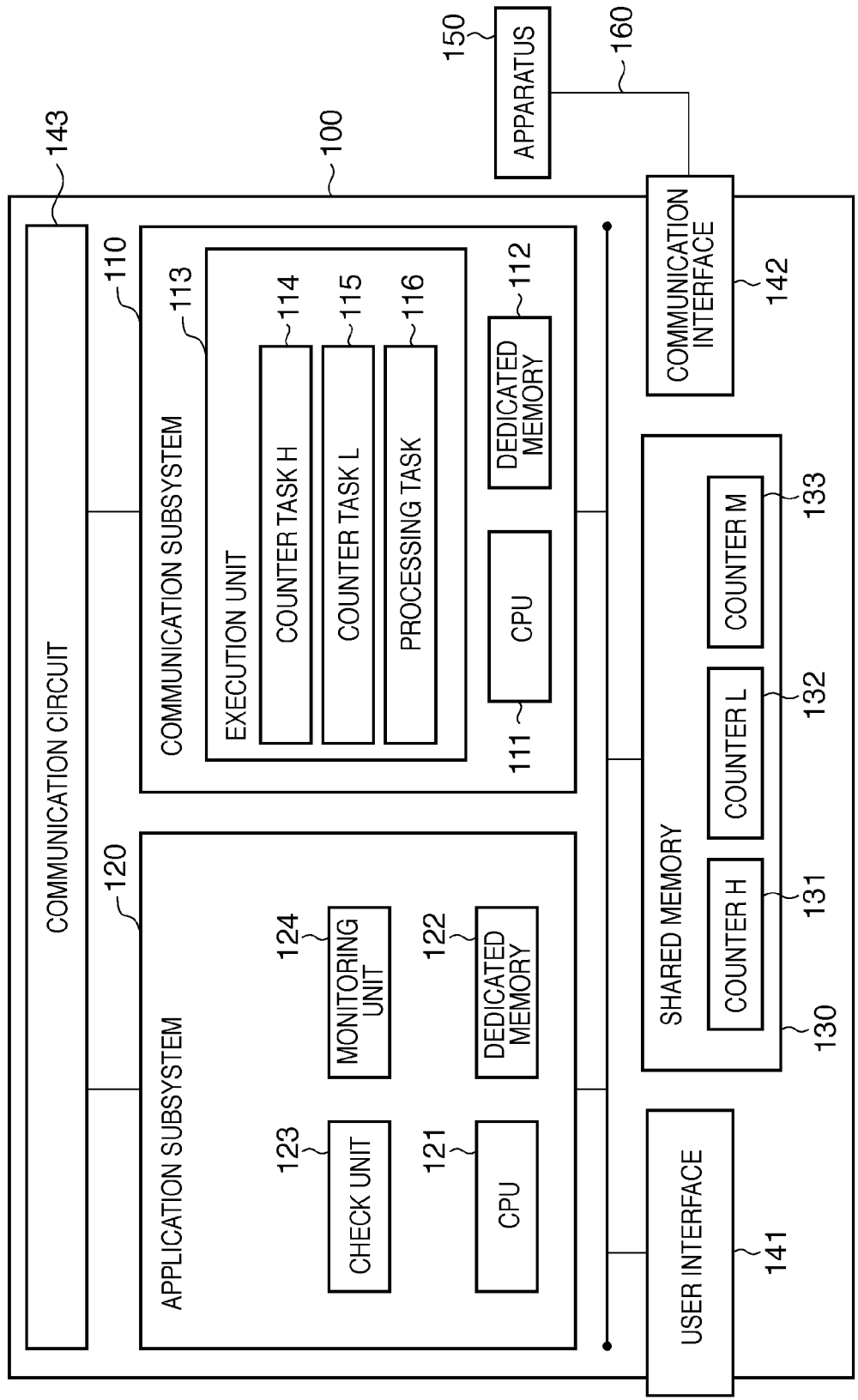
FIG. 1 is a block diagram useful in describing an exemplary configuration of an information processing apparatus 100 according to an embodiment.

The configuration of the information processing apparatus 100 according to this embodiment will be described with reference to FIG. 1. The information processing apparatus 100 includes the communication subsystem 110, the application subsystem 120, a shared memory 130, a user interface 141, a communication interface 142 and a communication circuit 143. For the sake of simplification, only the communication subsystem 110, which is a first subsystem, and the application subsystem 120, which is a second subsystem, are described in conjunction with FIG. 1. However, it does not matter even if the number of subsystems is greater than two. Further, in the first embodiment, a mode in which failure of the communication subsystem 110 is monitored by the application subsystem 120 will be described. However, failure monitoring may just as well be performed by another subsystem (not shown), and failure in a plurality of subsystems may be monitored as well.

The communication subsystem 110 executes processing such as TCP/IP and communication driver processing and includes a CPU 111, a dedicated memory 112 and an execution unit 113. The communication subsystem 110 provides a communication function using the communication interface 142 in a case where a communication processing request has been received from the other subsystem. The application subsystem 120 executes a network application such as an SMB or mail application and includes a CPU 121, a dedicated memory 122, a check unit 123 and a monitoring unit 124. The application subsystem 120 offloads TCP/IP and lower layer communication processing to the communication subsystem 110. The shared memory 130, which is shared by the communication subsystem 110 and application subsystem 120, includes a RAM and ROM for storing computer programs, data and temporary files shared by the subsystems. The shared memory 130 includes a first counter H 131, a second counter L 132 and a third counter M 133. The counter M 133 is used by a processing task 116 but is not employed in this embodiment.

The user interface 141, which acquires inputs from a user and outputs results to the user, includes a display, a keyboard and a pointing device and the like, by way of example. The communication interface 142 performs TCP/IP packet communication with another apparatus 150 connected via a network 160. The network may take on any form such as that of a wired LAN, wireless LAN or the Internet. The communication circuit 143 provides communication functionality between subsystems. For example, each subsystem gives notification of event information bidirectionally using the communication circuit 143.

The communication subsystem 110 will be described in further detail. The CPU 111 is a CPU used exclusively by the communication subsystem 110 and exercises overall control of the communication subsystem 110. The dedicated memory 112 is a memory used exclusively by the communication subsystem 110 and includes a RAM and ROM for storing computer programs and data used only by the communication subsystem 110. The execution unit 113 executes a first counter task H 114, a second counter task L 115 and the processing task 116 for implementing certain processing. The counter task H 114 executes first update processing for updating the counter H 131. The counter task L 115 executes second update processing for updating the counter L 132. In counter updating, the counter task usually increments the count value successively. However, as long as the fact that the counter has been updated can be recognized, the particular method does not matter. The processing task 116 executes processing related to TCP/IP processed by the communication subsystem 110. For example, the processing task 116 issues a transmit instruction to the communication interface 142. A plurality of the processing tasks 116 may exist.

The execution unit 113 launches the counter task H 114 and counter task L 115 periodically. For example, the execution unit 113 launches these counters whenever the system clock indicates elapse of a fixed period of time. The execution unit 113 executes the launched task in accordance with the priority of thereof. If, during execution of a task, a task having a priority higher than that of this task whose execution is in progress is launched, then the execution unit 113 shifts the execution authority to this launched task and executes this task. In this case, the processing of the task whose execution was in progress is suspended. On the other hand, if, during execution of a task, a task having a priority lower that of this task whose execution is in progress than this is launched, then the execution unit 113 continues processing the task whose execution is in progress without shifting the execution authority to the launched task. In this case, the launched task is placed in a waiting state until the end of processing of the task whose execution is in progress. The launched task is executed following the end of the task whose execution is in progress. The counter task H 114 has a priority higher than that of the processing task 116, and the counter task L 115 has a priority lower than that of the processing task 116. For example, the highest priority of a task within the communication subsystem 110 is set for the counter task H 114, and the lowest priority of a task within the communication subsystem 110 is set for the counter task L 115.

The application subsystem 120 will be described in further detail. The CPU 121 is a CPU used exclusively by the application subsystem 120 and exercises overall control of the application subsystem 120. The dedicated memory 122 is a memory used exclusively by the application subsystem 120 and includes a RAM and ROM for storing computer programs and data used only by the application subsystem 120. The check unit 123 checks periodically whether the counters of the shared memory 130 have been updated. The monitoring unit 124 senses failure of the communication subsystem 110 based upon result of the check performed by the check unit 123. These details will be described later.

[Operation of Communication Subsystem 110]

Figure 2:
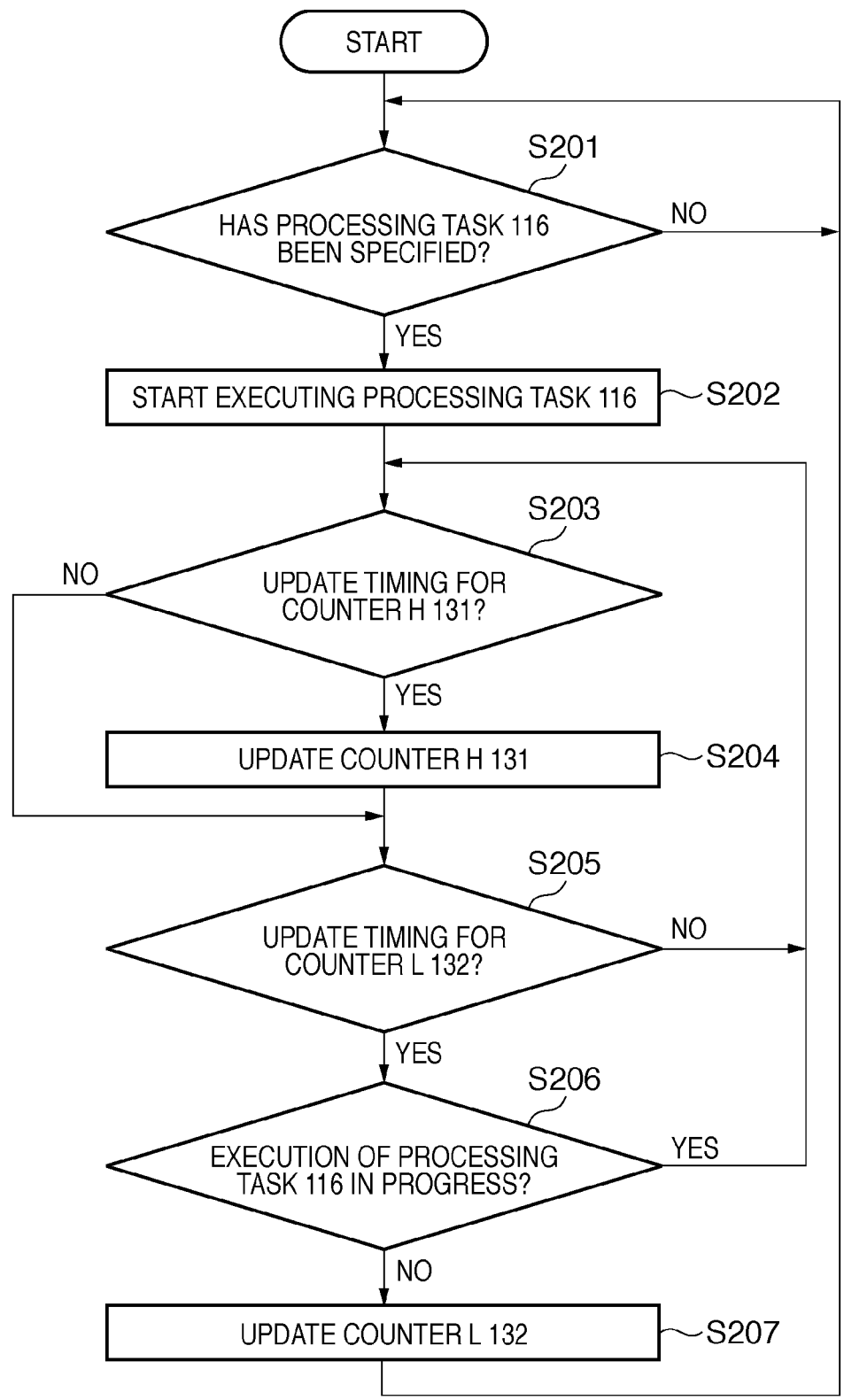
FIG. 2 is a flowchart useful in describing an exemplary operation of a communication subsystem 110 in an embodiment.

The operation of the communication subsystem 110 will be described with reference to the flowchart of FIG. 2. This flowchart is processed by having the CPU 111 execute a computer program that has been stored in the dedicated memory 112, which is a computer-readable recording medium.

At step S201, the execution unit 113 determines whether execution of the processing task 116 has been specified. If execution has not been specified ("NO" at step S201), then the processing of step S201 is repeated and the execution unit 113 waits for execution of the processing task 116 to be specified. If execution has been specified ("YES" at step S201), then the execution unit 113 launches the specified processing task 116 and starts execution thereof at step S202.

At step S203, the execution unit 113 determines whether the timing for launching the counter task H 114 has arrived. Processing shifts to step S204 if this is the launch timing ("YES" at step S203) and to step S205 if this is not the launch timing ("NO" at step S203). At step S204, the execution unit 113 launches the counter task H 114. Since the counter task H 114 has a priority higher than that of the processing task 116, this task is executed immediately and the counter H 131 updated even if the processing task 116 is currently being executed.

At step S205, the execution unit 113 determines whether the timing for launching the counter task L 115 has arrived. Processing returns to step S203 if this is not the launch timing ("NO" at step S205). The execution unit 113 launches the counter task L 115 and processing shifts to step S206 if this is the launch timing ("YES" at step S205).

At step S206, the execution unit 113 determines whether the processing task 116 is currently being executed. If execution is in progress ("YES" at step S206), the counter task L 115, the priority of which is lower than that of the processing task 116, is not executed and is placed in the waiting state. Accordingly, processing returns to step S203 and the execution unit 113 determines whether the update timing of the counter task H 114 has arrived. If the processing task 116 is not currently being executed ("NO" at step S206), then the counter task L 115 is executed and the counter L 132 updated at step S207. Thereafter, processing returns to step S201 and the execution unit 113 waits for execution of a new processing task 116 to be specified. It should be noted that in a case where the counter task L 115 has already been launched at step S205, a new counter task L 115 need not be launched.

Thus, as described above, if the state is such that the communication subsystem 110 is capable of executing a task, then the counter H 131 is always updated by the counter task H 114 regardless of whether the processing task 116 is currently being executed or not. On the other hand, in a case where the processing task 116 is currently being executed, the counter task L 115 is not executed and the counter L 132 is not updated.

[Operation of Application Subsystem 120]

Figure 3:
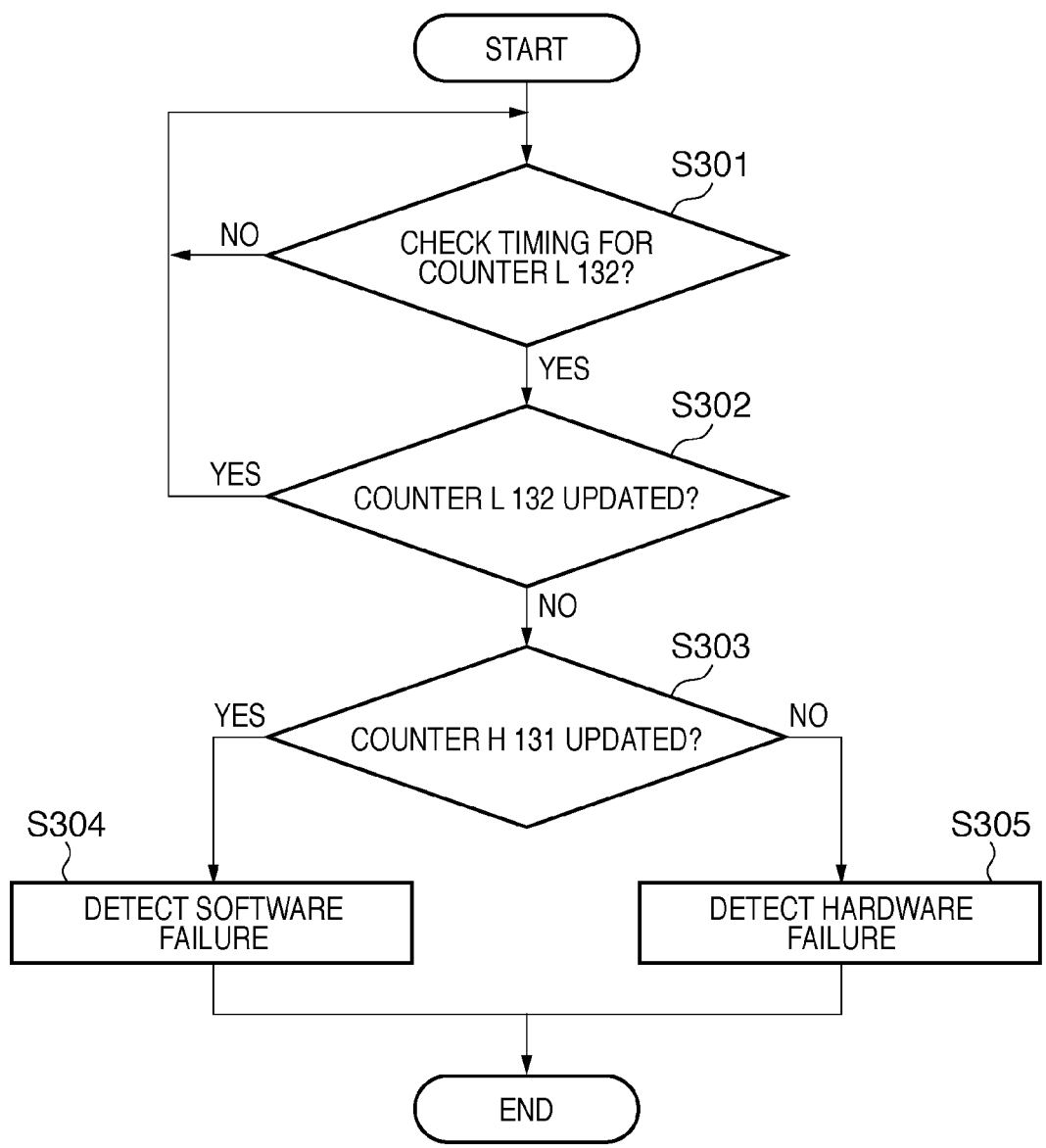
FIG. 3 is a flowchart useful in describing an exemplary operation of an application subsystem 120 in an embodiment.

The operation of the application subsystem 120 will be described with reference to the flowchart of FIG. 3. This flowchart is processed by having the CPU 121 execute a computer program that has been stored in the dedicated memory 122, which is a computer-readable recording medium. For the sake of simplification, only operation relating to monitoring of the communication subsystem 110 will be described.

At step S301, the check unit 123 determines whether the timing for checking the counter L 132 has arrived. If this is not the check timing ("NO" at step S301), the processing of step S301 is repeated. If this is the check timing ("YES" at step S301), then the check unit 123 checks whether the counter L 132 has been updated at step S302. If the counter L132 has been updated ("YES" at step S302), processing returns to step S301. If the counter L 132 has not been updated ("NO" at step S302), then the check unit 123 checks whether the counter H 131 has been updated at step S303. If the counter H 131 has been updated ("YES" at step S303), processing shifts to step S304. If the counter H 131 has not been updated ("NO" at step S303), then processing shifts to step S305.

At step S304, the monitoring unit 124 detects the fact that a software failure has occurred in the communication subsystem 110. Here the term "software failure" refers to a state in which execution authority in a subsystem is possessed unjustifiably, where such a state may be deadlock or an infinite loop that is capable of occurring in the processing task 116. In the event that software failure has occurred, no task of the same or lower priority than that of the processing task 116 in which the failure has occurred is executed until recovery from the failure has been achieved. Accordingly, in a case where counter H 131 has been updated but counter L 132 has not, the monitoring unit 124 determines that software failure has occurred in the communication subsystem 110.

At step S305, on the other hand, the monitoring unit 124 detects the fact that a hardware failure has occurred in the communication subsystem 110. Here the term "hardware failure" refers to an exceptional state in which no task whatsoever can be executed in a subsystem owing to a device failure such as CPU failure or memory failure. Since the counter task H 114 has a priority higher than that of the processing task 116, the counter task H 114 is always executed even in a case where software failure has occurred in the subsystem. In a case where the counter H 131 has not been updated, therefore, the monitoring unit 124 determines that hardware failure has occurred in the communication subsystem 110.

In a case where the counter L 132 has been updated, the counter H 131 also has always been updated and therefore it will suffice if the check unit 123 checks only the counter L 132 periodically. Further, in a case where the counter has not been updated even though it has been checked a plurality of times, the communication unit 123 may just as well render the decision that the counter has not been updated.

[Sequence of Information Processing Apparatus 100 During Normal Operation]

Figure 4:
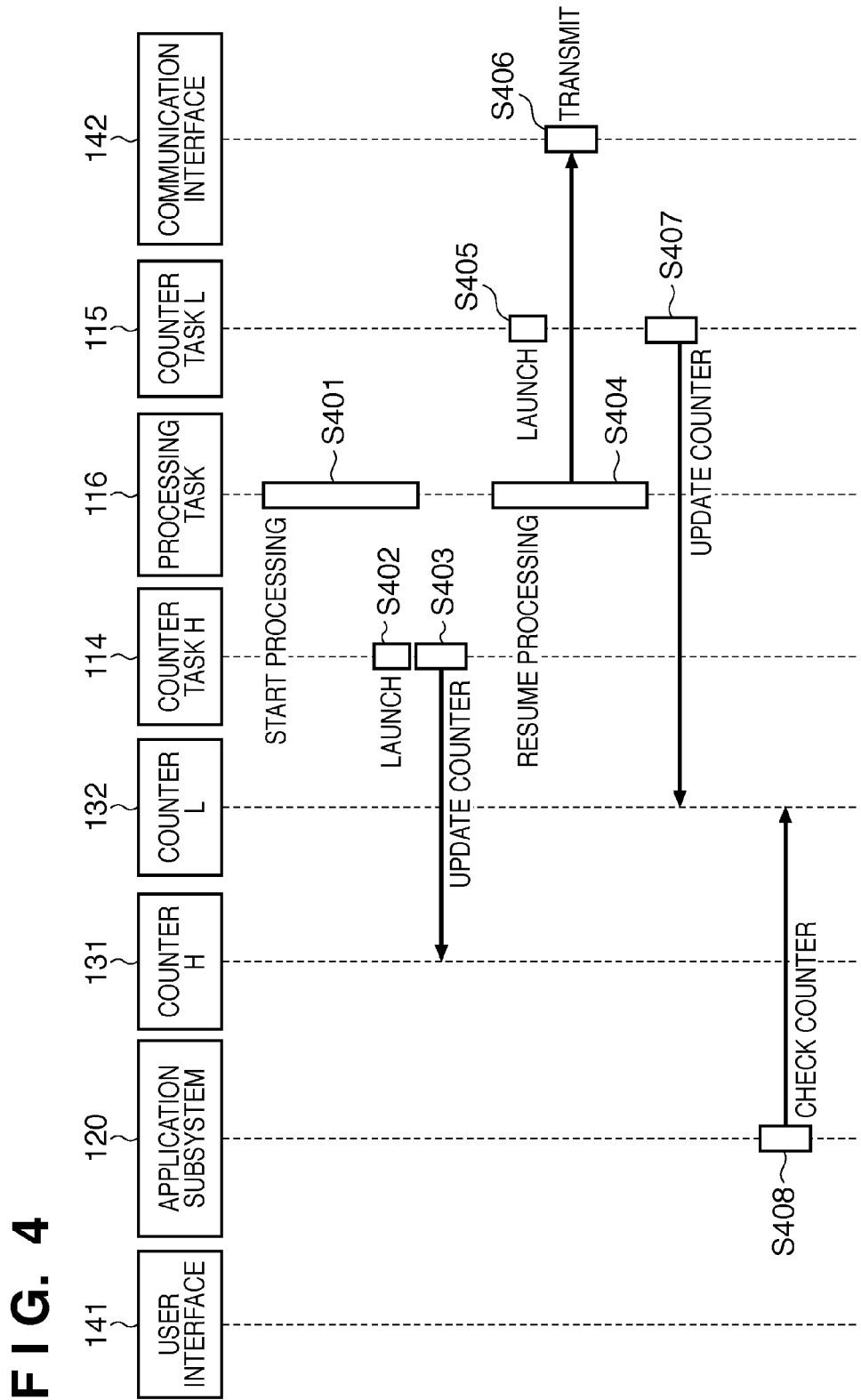
FIG. 4 is an exemplary sequence diagram of the information processing apparatus 100 at the time of normal operation in a first embodiment.

The overall operation of the information processing apparatus 100 during normal operation will be described with reference to the sequence diagram of FIG. 4. Assume that the processing task 116 is processing in which the communication subsystem 110 executes processing for making a transmission to the other apparatus 150. It will be assumed that the processing of the processing task 116 is similar in the embodiments below.

The execution unit 113 starts the processing task 116 at step S401 and launches the counter task H 114 at step S402. Since the priority of the counter task H 114 is higher than that of the processing task 116, the execution authority shifts to the counter task H 114 and the processing of the processing task 116 is suspended. The counter H 131 is updated at step S403. At step S404, the execution unit 113 resumes the processing of the processing task 116. At step S405, the execution unit 113 launches the counter task L 115 but since the processing task 116 whose priority is higher is currently being executed, the counter task L 115 is not executed immediately and is placed in the waiting state. The processing task 116 issues a transmission processing instruction to the communication interface 142 and, at step S406, the communication interface 142 executes transmission processing. After the processing of the processing task 116 ends, the execution authority shifts to the counter task L 115 and the execution unit 113 executes the counter task L 115 and updates the counter L 132 at step S407. At step S408, the check unit 123 determines whether the counter L 132 has been updated. If the counter L 132 has been updated, naturally the counter H 131 also has been updated and therefore it is not necessary for the check unit 123 to check the updating of the counter H 131. In this case, the monitoring unit 124 determines that a failure has not occurred in the communication subsystem 110.

[Sequence of Information Processing Apparatus 100 if Software Failure has Occurred]

Figure 5:
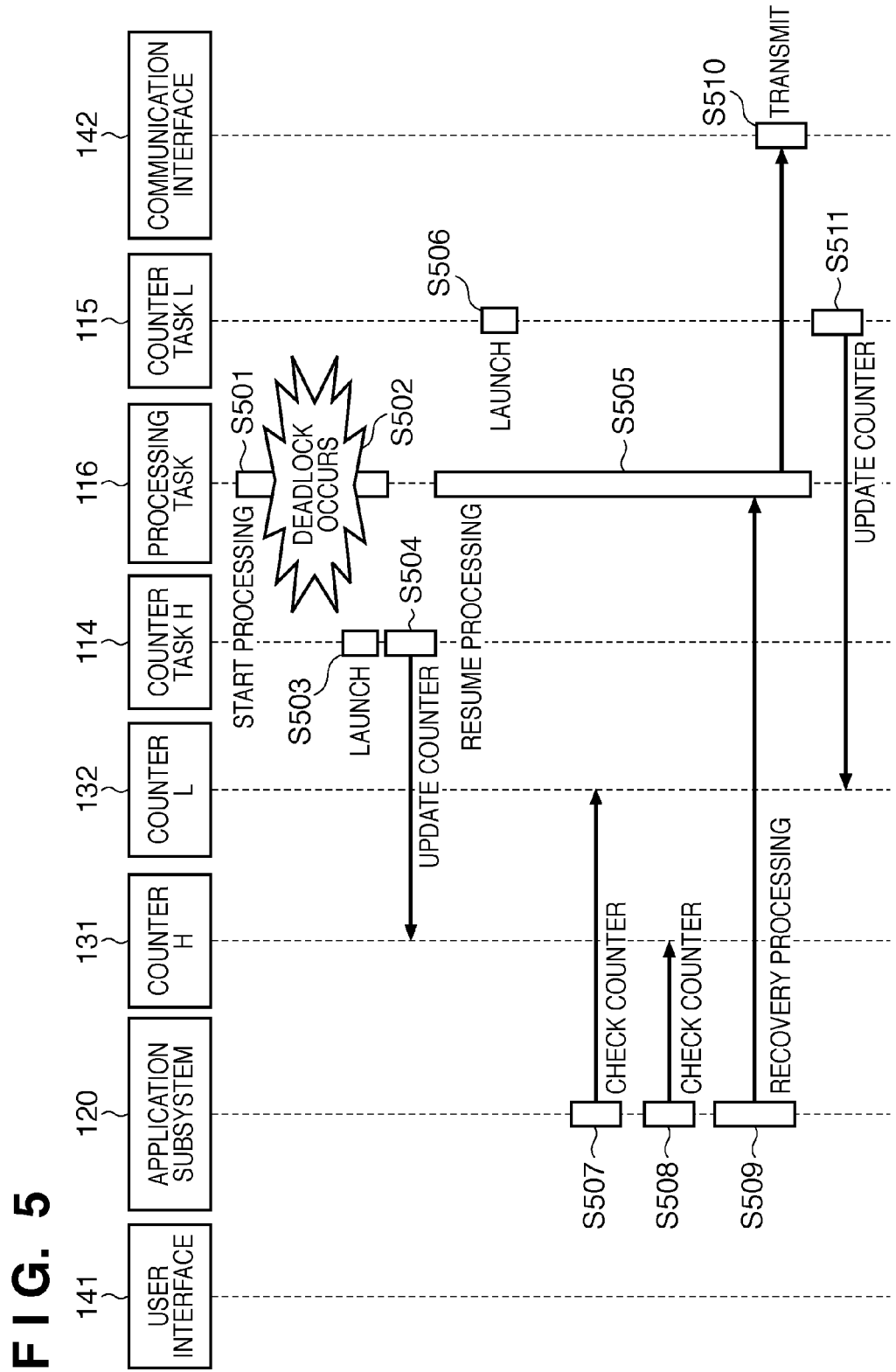
FIG. 5 is an exemplary sequence diagram of the information processing apparatus 100 in a case where software failure has occurred in the first embodiment.

The overall operation of the information processing apparatus 100 in a case where software failure has occurred will be described with reference to the sequence diagram of FIG. 5. The execution unit 113 starts the processing task 116 at step S501. Assume that deadlock has occurred in the processing task 116 at step S502. In this case, until the deadlock is eliminated, the execution authority does not shift to the processing task 116, whose priority is the same as or lower than that of the processing task 116 currently being executed, and therefore the processing of the processing task 116 is not executed. The execution unit 113 launches the counter task H 114 at step S503. Since the priority of the counter task H 114 is higher than that of the processing task 116, the execution authority shifts to the counter task H 114, even in this case where deadlock has occurred, and the processing of the processing task 116 is suspended. The counter H 131 is updated at step S504 and the execution unit 113 resumes the processing of the processing task 116 at step S505. At step S506, the execution unit 113 launches the counter task L 115 but since the processing task 116 whose priority is higher is currently being executed, the counter task L 115 is not executed immediately and is placed in the waiting state. The counter task L 115 is not executed until the deadlock is eliminated.

At step S507, the check unit 123 determines whether the counter L 132 has been updated. Since the counter L 132 has not been updated, the check unit 123 checks whether the counter H 131 has been updated at step S508. Since the counter H 131 has been updated, the monitoring unit 124 determines that a software failure has occurred in the communication subsystem 110. Accordingly, at step S509, the monitoring unit 124 subjects the communication subsystem 110 to processing for recovery from deadlock. As an example of deadlock recovery processing, the software is re-launched. Once its deadlock has been eliminated, the processing of the processing task 116 continues. At step S510, the communication interface 142 executes transmission processing. After the processing of the processing task 116 ends, the execution authority shifts to the counter task L 115 and the execution unit 113 executes the counter task L 115 and updates the counter L 132 at step S511.

[Sequence of Information Processing Apparatus 100 if Hardware Failure has Occurred]

Figure 6:
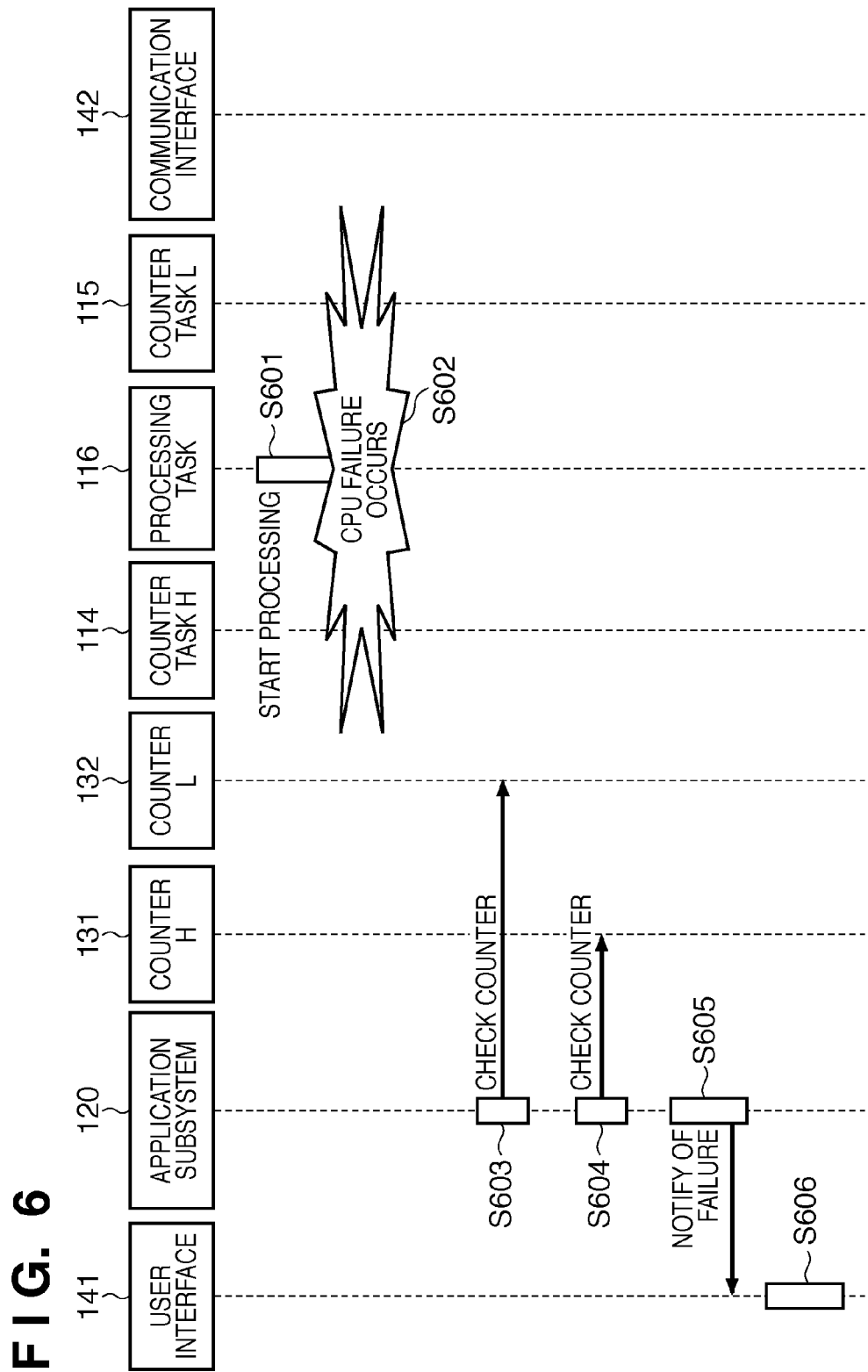
FIG. 6 is an exemplary sequence diagram of the information processing apparatus 100 in a case where hardware failure has occurred in the first embodiment.

The overall operation of the information processing apparatus 100 in a case where hardware failure has occurred will be described with reference to the sequence diagram of FIG. 6.

The execution unit 113 starts the processing task 116 at step S601. Assume that the CPU 111 of the communication subsystem 110 has given rise to a hardware failure at step S602. In such case none of the tasks included in the communication subsystem 110 are executed until the CPU failure is eliminated. The check unit 123 checks whether the counter L 132 has been updated at step S603. Since the counter L 132 has not been updated, the check unit 123 checks whether the counter H 131 has been updated at step S604. Since the counter H 131 also has not been updated, the monitoring unit 124 determines that a hardware failure has occurred in the communication subsystem 110. Accordingly, at step S605, the monitoring unit 124 sends the user interface 141 an instruction to give notification of the failure. Then, at step S606, the user interface 141 notifies the user of the information processing apparatus 100 of the fact that a hardware failure has occurred in the communication subsystem 110.

[Sequence of Information Processing Apparatus 100 if Error has Occurred]

Figure 7:
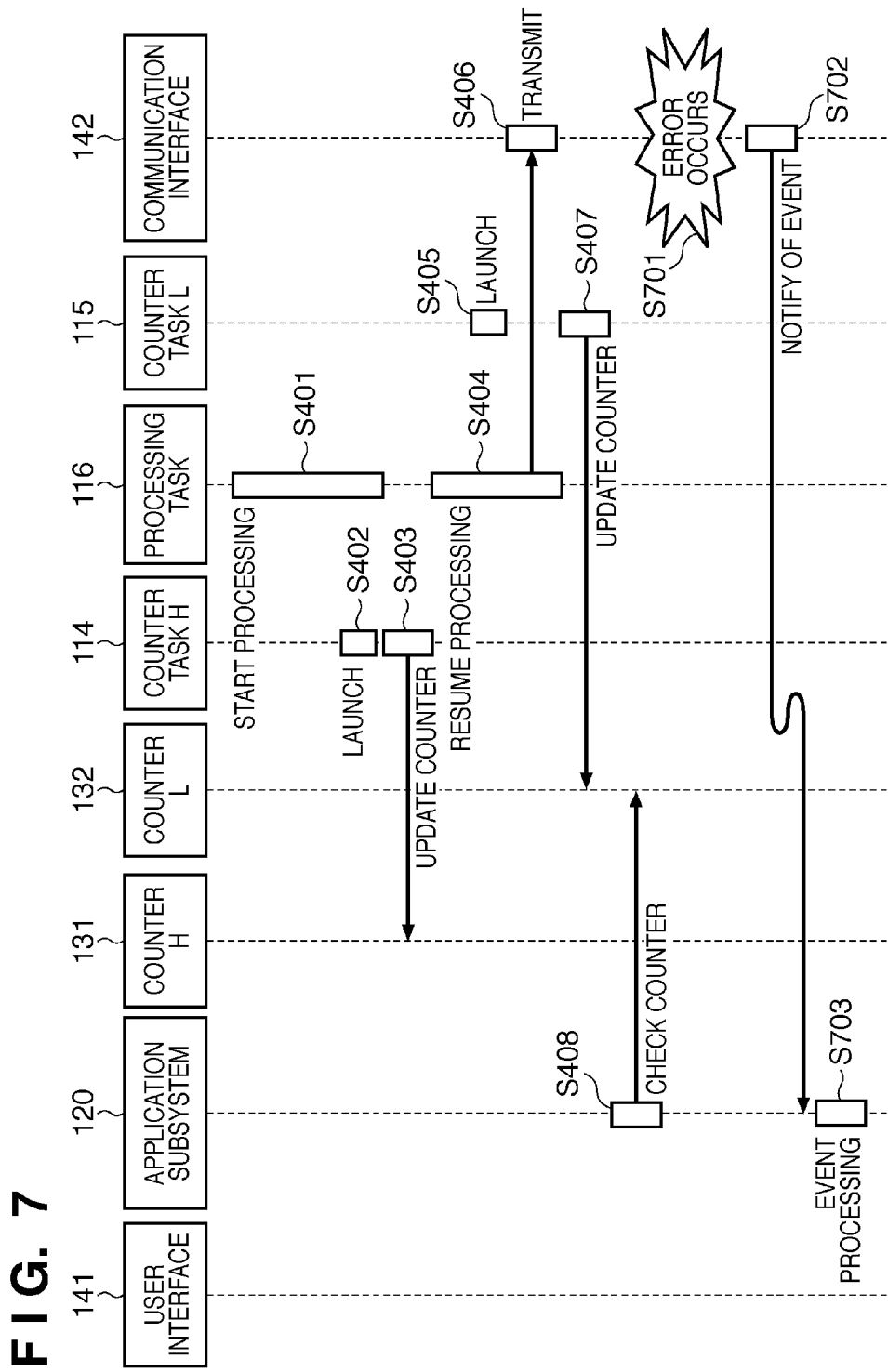
FIG. 7 is an exemplary sequence diagram of the information processing apparatus 100 in a case where an error has occurred in the first embodiment.

The operation of the information processing apparatus 100 in a case where an error has occurred will be described with reference to the sequence diagram of FIG. 7. Processing similar to that of the sequence described above with reference to FIG. 4 is designated by like step numbers and need not be described again. Assume that an error has occurred in the communication interface 142 at step S701. In such case the communication interface 142 notifies the monitoring unit 124 of an event error at step S702. Since the counter L 132 has been updated, the monitoring unit 124 determines that a failure has not occurred in the communication subsystem 110 and executes recovery processing for the ordinary event error at step S703.

Thus, in accordance with this embodiment, as described above, the application subsystem 120 is capable of accurately detecting a failure that has occurred in the communication subsystem 110. Furthermore, it is possible for the type of failure that has occurred to be detected as either a software failure or a hardware failure. Accordingly, it is possible to take measures (recovery processing and user notification) conforming (suited) to the type of failure that has occurred.

Second Embodiment

In this embodiment, a case will be described where the processing task 116 also updates a counter in the information processing apparatus 100 described in the first embodiment. The diagram of the configuration of the information processing apparatus 100 in this embodiment is similar to that of FIG. 1 used in the first embodiment and need not be described again. In this embodiment, however, use is made of the counter M 133, which was not used in the first embodiment. In a case where processing within the processing task 116 itself has ended normally, the processing task 116 executes third update processing for updating the counter M 133. Furthermore, the check unit 123 checks whether the counter M 133 has been updated. If the check timing has arrived, the check unit 123 checks whether the counter L 132 and counter M 133 have been updated. If the result of the checking is that the counter M 133 has been updated, processing similar to that of the first embodiment is executed. If the counter L 132 has been updated by the counter M 133 has not, then the monitoring unit 124 determines that the processing task 116 has not ended normally but has ended owing to an error. In a case where deadlock has occurred in the processing task 116 owing to an error, neither the counter M 133 nor the counter L 132 is updated. The monitoring unit 124 therefore determines that a software failure has occurred in the communication subsystem 110 and executes recovery processing in a manner similar to that of the first embodiment. Since the operation of the communication subsystem 110 and application subsystem 120 is similar to that of the first embodiment, a description based upon flowcharts will be omitted and only the portions that differ will be described below with reference to sequence diagrams.

[Sequence of Information Processing Apparatus 100 if Processing Task has Ended Normally]

Figure 8:
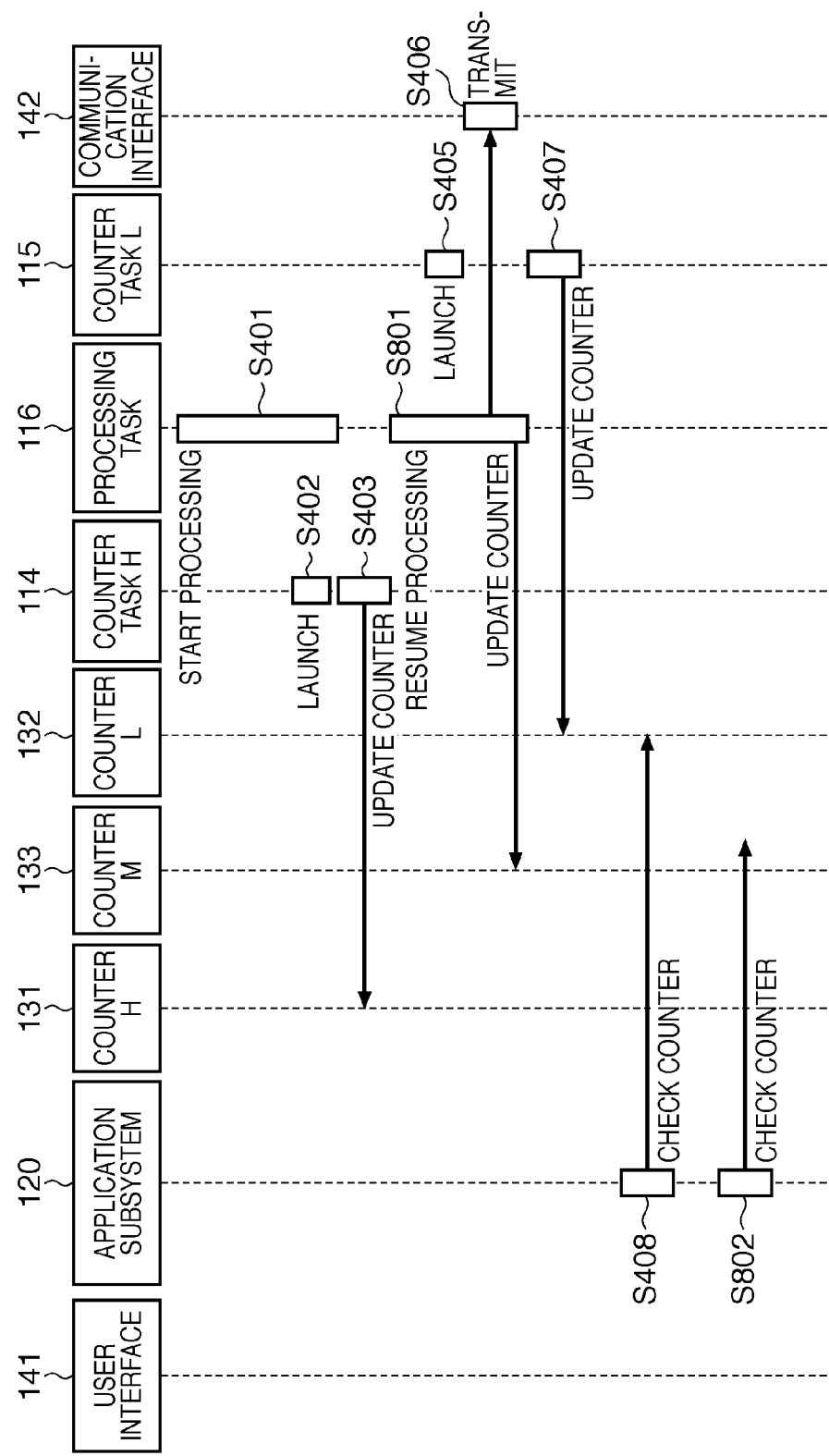
FIG. 8 is an exemplary sequence diagram of the information processing apparatus 100 in a case where processing has ended normally in a second embodiment.

The operation of the information processing apparatus 100 in a case where processing has ended normally will be described with reference to the sequence diagram of FIG. 8. Processing similar to that of the sequence described above with reference to FIG. 4 is designated by like step numbers and need not be described again. At step S801, the processing task 116 whose processing has been resumed updates the counter M 133 if processing has ended normally. At step S802, the check unit 123 checks whether the counter M 133 has been updated. In this case, the counter M 133 has been updated and therefore the monitoring unit 124 determines that the processing task 116 has ended normally. In order that the check unit 123 may check whether the counter M 133 has been updated, it checks the count value in the counter M 133 before the processing task 116 begins.

[Sequence of Information Processing Apparatus 100 if Processing has Ended in Error]

Figure 9:
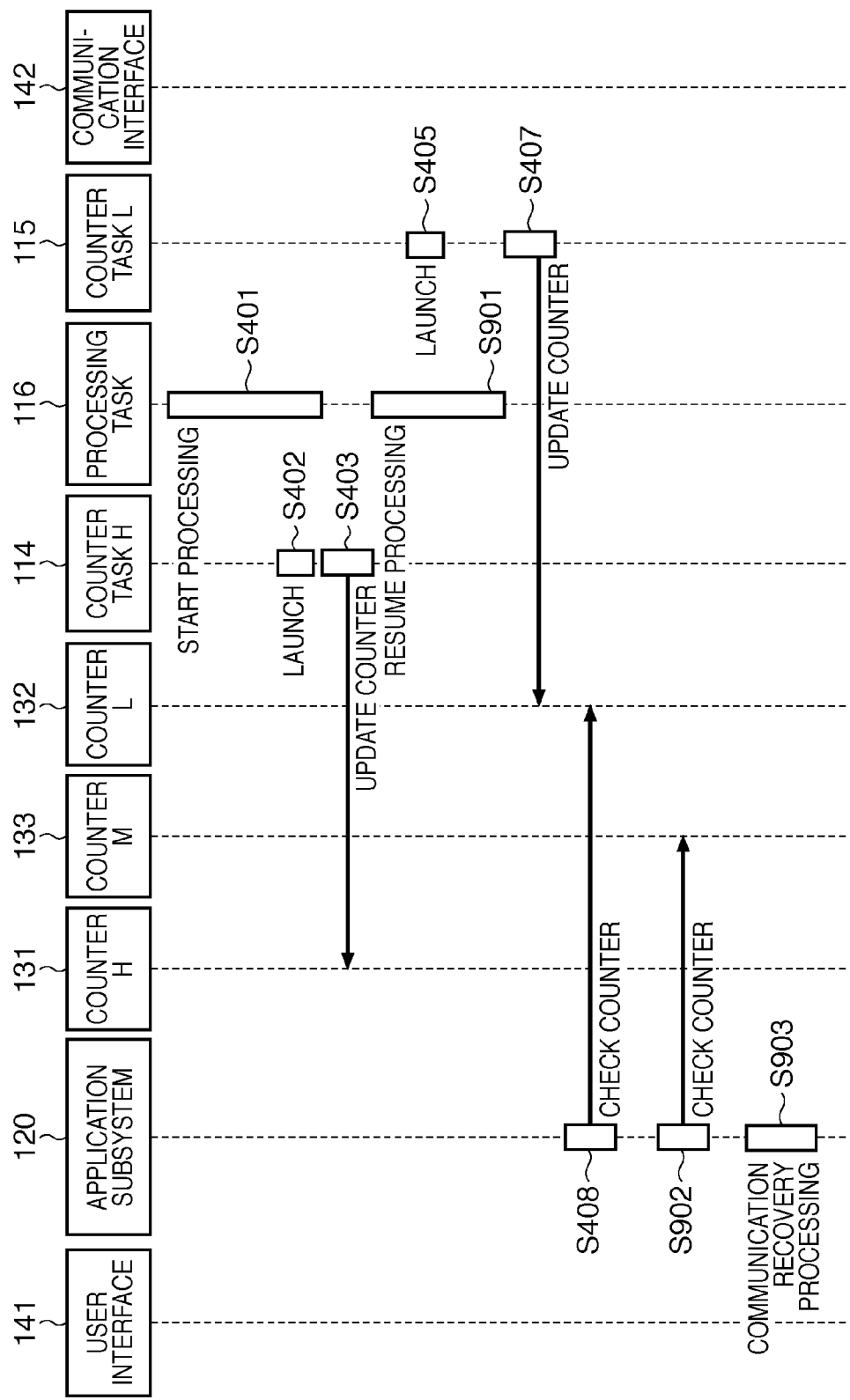
FIG. 9 is an exemplary sequence diagram of the information processing apparatus 100 in a case where processing has ended in error in the second embodiment.

The operation of the information processing apparatus 100 in a case where processing has ended in error will be described with reference to the sequence diagram of FIG. 9. Processing similar to that of the sequence described above with reference to FIG. 4 is designated by like step numbers and need not be described again. At step S901, assume that the processing of the processing task 116 whose processing has been resumed ends owing to error. The counter M 133 is not updated in this case. At step S902, the check unit 123 checks whether the counter M 133 has been updated. Since the counter M 133 has not been updated in this case, the monitoring unit 124 determines that the processing task 116 has not ended normally. Furthermore, since the counter L 132 has been updated, the monitoring unit 124 determines that a failure has not occurred in the communication subsystem 110. Accordingly, at step S903, the monitoring unit 124 determines that the processing of the processing task 116 ended owing to error and execute error recovery processing.

Thus, in accordance with this embodiment, as described above, the application subsystem 120 is capable of determining an error that has occurred in the communication subsystem 110. Furthermore, the application subsystem 120 is capable of determining whether this error has been caused by a software failure.

Third Embodiment

This embodiment will be described with regard to a case where the processing task 116 updates each of the counters in the information processing apparatus 100 described in the first embodiment. The diagram of the configuration of the information processing apparatus 100 in this embodiment is similar to that of FIG. 1 used in the first embodiment and need not be described again.

In this embodiment, the communication subsystem 110 has a plurality of processing tasks 116 and the processing tasks 116 have a variety of priorities. Furthermore, the shared memory 130 has counters corresponding to respective ones of the processing tasks 116. In other words, the shared memory 130 has per-task counters. In a case where the processing of a processing task 116 has ended, the processing task 116 updates the associated per-task counter. Here the processing task 116 updates the per-task counter regardless of whether the processing ends normally or in error. Furthermore, the check unit 123 checks whether the per-task counter has been updated.

Assume that the check unit 123 has confirmed per-task counters that have not been updated. In this case the monitoring unit 124 checks the priorities of the per-task counters that have not been updated. The monitoring unit 124 determines that software failure has occurred in the processing task 116 having the highest priority among the priorities of the per-task counters that have not been updated. The reason for this is that if a software failure has occurred in a processing task 116 having a certain priority, execution authority will not shift to processing tasks 116 having a priority lower than this priority and these per-task counters also will not be updated.

Thus, in accordance with this embodiment, as described above, if a software error has occurred in the communication subsystem 110, it is possible for the application subsystem 120 to specify in which processing task 116 of a particular priority the software failure occurred.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118042, filed May 14, 2009, which is hereby incorporated by reference herein in its entirety.

What is claimed is:

1. An information processing apparatus comprising:
a first subsystem and a second subsystem,
wherein said first subsystem comprises:
a processor configured to execute first and second software processing, the first software processing including:
updating a first software counter at a priority higher than that of the second software processing, and
updating a second software counter at a priority lower than that of the second software processing; and
wherein said second subsystem comprises:
a check unit configured to check whether the first and second software counters have been updated; and
a determination unit configured to determine, according to a check result of the check unit, that hardware failure has occurred in the processor if the first and second software counters have not been updated and that software failure has occurred in the second software processing if the first software counter has been updated but the second software counter has not been updated.

2. The apparatus according to claim 1, wherein the software failure includes at least one of deadlock and an infinite loop that has occurred in the second software processing.

3. The apparatus according to claim 1, wherein the hardware failure includes at least one of CPU failure and memory failure that has occurred in the processor.

4. The apparatus according to claim 1, wherein the determination unit determines that neither software failure nor hardware failure has occurred in said first subsystem if the second software counter has been updated.

5. The apparatus according to claim 1, further comprising a memory shared by said first and second subsystems, wherein the first and second software counters are included in said memory.

6. The apparatus according to claim 1, further having a third software counter, and wherein:
the first software processing further includes updating the third software counter if the second software processing has ended normally;
said check unit determines whether the third software counter has been updated; and
said determination unit determines that the second software processing has not ended normally if the third software counter has not been updated.

7. The apparatus according to claim 1, wherein:
the second software processing includes a plurality of processing tasks having priorities that differ from one another;

the information processing apparatus further comprises per-task counters corresponding to respective ones of the plurality of processing tasks;

the plurality of processing tasks update respective ones of the corresponding per-task counters if the processing has ended;

said check unit determines whether the per-task counters have been updated; and if a per-task counter has not been updated, said determination unit specifies the priority of the processing task in which software failure has occurred, based upon the per-task counter that has not been updated.

8. A non-transitory computer-readable storage medium storing, in executable form, a program for causing a computer to function as the information processing apparatus according to claim 1.

9. A method of controlling an information processing apparatus having a first subsystem comprising a processor and a second subsystem, wherein the processor of the first subsystem executes steps of:

executing a software processing;

updating a first software counter at a priority higher than that of the software processing; and updating a second software counter at a priority lower than that of the software processing; and wherein the second subsystem executes steps of:

determining whether the first and second software counters have been updated; and determining that hardware failure has occurred in the processor if the first and second software counters have not been updated and that software failure has occurred in the software processing if the first software counter has been updated but the second software counter has not been updated.

* * * * *